Oct. 21, 1958  M. SYRBE  2,857,563
RESET MAGNETIC AMPLIFIER CONTROLLED RECTIFIER
AND INVERTER APPARATUS
Filed April 8, 1955  2 Sheets-Sheet 2

INVENTOR
Max Syrbe
BY Pierce, Scheffler & Parker
ATTORNEYS

United States Patent Office 2,857,563
Patented Oct. 21, 1958

2,857,563

RESET MAGNETIC AMPLIFIER CONTROLLED RECTIFIER AND INVERTER APPARATUS

Max Syrbe, Mannheim-Wallstadt, Germany, assignor to Brown, Boveri & Cie., Aktiengesellschaft, Mannheim, Germany, a joint-stock company Application April 8, 1955, Serial No. 500,259

5 Claims. (Cl. 321—25)

The present invention relates in general to rectifier systems and more particularly to those of the type wherein the rectifier valve or element is of the disc or "dry" type as distinguished from the grid controlled type, and current flow through the rectifier valve to the load is controlled by means of an iron core type impedance inserted in the line between the alternating current supply mains and the rectifier valve, the magnetic characteristics of the core and hence also the magnitude of impedance being varied as required to thus control the rectifier current. Such systems are often referred to as magnetic amplifier controlled rectifiers or as saturable core impedance regulated rectifiers. For the purposes of this invention, such rectifier systems will be referred to as magnetic amplifier controlled rectifiers.

Up to the present, magnetic amplifiers of known or proposed types such as the inductivity, current limiting, saturation angle and reset controlling magnetic amplifiers are used to control a working current which is taken directly from alternating current mains, or indirectly from those mains by way of transformers, the current being passed to the load through a magnetic amplifier and a rectifier valve. A reverse direction of the current or energy flow has not been possible, and particularly, the direct current energy which had been accumulated could not be returned by the magnetic amplifier to the alternating current mains as a controllable alternating current energy. The arrangement of the rectifier elements or else the manner and method of the demagnetizing process necessary to control the magnetic amplifier did not permit a return of energy to the alternating current source. In other words, the previously designed magnetic amplifier controlled rectifiers were incapable of acting as an inverter. The controlling of the abovementioned four types of magnetic amplifiers occurs according to basically different principles. Whereas, rectifiers of the inductivity, current limiting and saturation angle types are controlled with the aid of a direct current which exists constantly and continuously for a modulation condition and leaves all remagnetizing and demagnetizing processes to the alternating voltage of the working circuit, in the reset magnetic amplifier, by way of rectifiers, the remagnetizing processes are assigned to the working circuit but the demagnetizing processes are assigned to the control circuit. The control of the reset type magnetic amplifier can therefore no longer be performed with direct current for determining output energy but can occur with the aid of voltage period integrals (magnetic fluxes) as independent determining energy and which, during the control periods, i. e. in periods during which the working circuit is blocked by way of rectifiers belonging to it, are placed on the control coils of the chokes, i. e. core type impedances, of the reset magnetic amplifier.

The present invention is concerned with a reset magnetic amplifier with direct current control normally on the output side. According to the invention, provision is made for the amplifier, supplying an inductive or motor load, to be controlled by a voltage time integral which demagnetizes the choke belonging to it within a control period shorter than the period of the alternating current supply voltage, during the working half periods of negative choke supply alternating voltage. In this invention the demagnetizing voltage time integral effective on a choke within the shortened control period is chosen of such a magnitude that within the subsequent working period the corresponding choke coil takes over the current in the transition from the positive to the negative supply voltage values. In this manner, a reset magnetic amplifier exists which is able to supply inductive or motor loads alone with direct current energy by adjusting a control unit, as desired, or else to take direct current energy from them and return it to the supply mains as alternating current energy. The reset magnetic amplifier according to the invention therefore is capable of operation both as a rectifier and as an inverter and, therefore, as a result of its extraordinary high speed of response, can also suffice for the same working conditions as are normally expected of grid-controlled rectifier apparatus. By my invention a sturdy magnetic amplifier has been provided which may be utilized in places where previously magnetic amplifiers having rectifiers of the grid-controlled type were required.

In the reset magnetic amplifier according to this invention, the controlling, demagnetizing voltage time integral can be obtained in a manner which is both simple and practical by cutting off a sine half-cycle of the choke supply alternating voltage. In certain cases, however, it will be found advantageous if, in accordance with the invention, the controlling demagnetizing voltage integral is produced by means of a current transformer or other similar impulse provider.

In the drawings which illustrate one practical embodiment of the invention,

Figure 1:
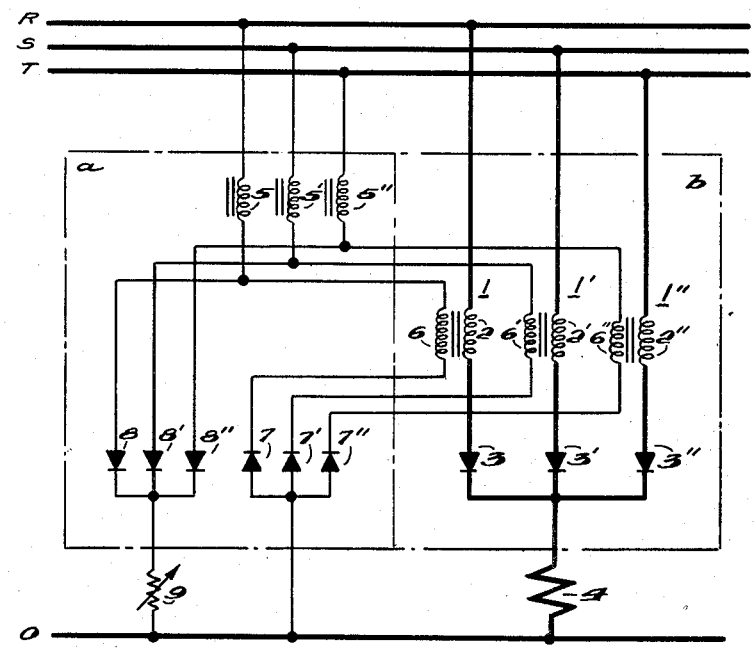
Fig. 1 is a schematic circuit diagram of the control and the load circuit.

With reference now to Fig. 1, the reset magnetic amplifier is shown enclosed within the dot-dashed rectangle *b*. As is evident, the amplifier is of the three-phase type receiving power from the alternating current supply voltage mains R, S and T. Power from phase R flows through coil 2 of choke 1 and rectifier valve 3 to one side of the load 4 which can be the exciter coil of a direct current motor, the remainder of the latter not being illustrated. The other side of the load 4 is connected to the neutral conductor O. Power from phase S flows through coil 2' of choke 1' and rectifier valve 3' to load 4; and power from phase T flows through coil 2" of choke 1" and rectifier valve 3" to load 4. The control circuits of the reset magnetic amplifier *b* are supplied from a three-phase first-stage magnetic amplifier, also of the reset type, and which is shown enclosed by the dot-dashed rectangle *a*. The control circuits of the reset magnetic amplifier *b* comprise the working circuits of the low stage reset magnetic amplifier *a*. That is, the working circuit of the latter associated with phase R extends from this phase through choke 5, control winding 6 for coil 2 of choke 1 and rectifier valve 7 to the common return conductor O. In a similar manner, the working circuit of the low stage reset magnetic amplifier *a* associated with phase S extends from this phase through choke 5', control winding 6' for coil 2' of choke 1' and rectifier valve 7' to the conductor O, and the working circuit of the low stage reset magnetic amplifier $a$ associated with phase T extends from this phase through choke 5'', control winding 6'' for coil 2'' of choke 1'' and rectifier valve 7'' to conductor O.

The low stage reset magnetic amplifier $a$ itself is controlled by control circuits which lead respectively from the phases R, S and T to the common conductor O through the chokes 5, 5' and 5'' respectively, the rectifier valves 8, 8' and 8'' respectively and the control unit 9 common to all phases which can be a variable control resistance. Within the control semi-periods of the low-stage magnetic amplifier $a$, the respective phase voltages are divided into impedances 5, 5', 5'' and the control resistance 9. The greater the resistance of the latter, the smaller are the voltages impressed on the respective impedances 5, 5', 5'' during the control semi-period and the smaller also are the voltage time integrals demagnetizing the impedances, but nothing other than the full working current starts to flow during the remagnetization of the impedances 5, 5', 5'' within the working semi-final. The low-stage magnetic amplifier $a$ thus produces a higher modulation at higher settings of control resistance 9.

As may be seen from Fig. 1, the working half-cycles of magnetic amplifier $b$ run through the windings 2, 2', 2'' of the impedances 1, 1', 1'' while the other half-cycles run through the control windings 6, 6', 6'' of the impedances. Through the latter windings one demagnetizing voltage time integral each is impressed upon the impedances 1, 1', 1''. In the working half-cycle of the network voltage immediately following the control half-cycle, the impedances 1, 1', 1'' must first be magnetized to the saturation point through their operating windings 2, 2', 2'', and the associated rectifiers 3, 3', 3'' by reception of one of the preceding equal voltage time integrals before the restricted working current can flow through the load 4. Thus the magnitude of the demagnetizing voltage time integral determines the degree of modulation factor of the magnetic amplifier $b$.

Figure 2:
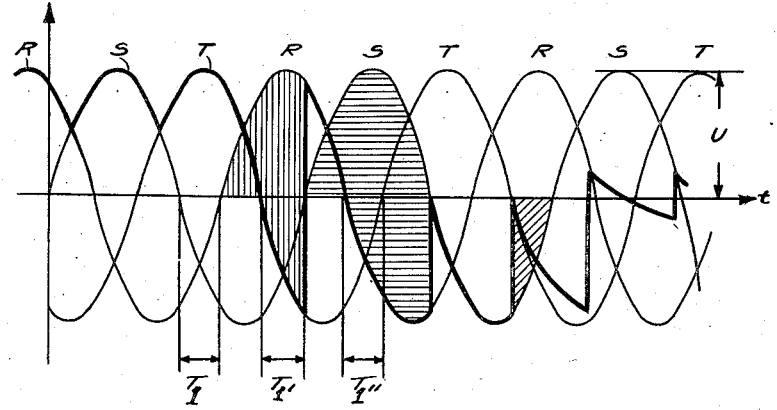
Fig. 2 is a plot showing the course of the voltages of the polyphase alternating current mains in relation to the operation of the chokes of the magnetic amplifier.

To explain the manner of operation, reference is now made to Fig. 2 which illustrates the current-voltage relations of the three-phase, one way reset magnetic amplifier unit $b$. In this relationship, it is assumed that at the instant $t=O$, the chokes 5, 5' and 5'' are fully demagnetized by setting control resistance 9 to a proper small value. Thereby, at such instant, no demagnetizing voltage integral can become effective on the control windings 6, 6' and 6'' of the chokes 1, 1' and 1''. As a result of the full demagnetization, the impedances 5, 5', 5'' form very high resistances so that the system phase voltages are impressed almost completely on the impedances 5, 5', 5'' with practically no potential drop on the windings 6, 6', 6''. Thereby the choke coil 2 connected to the main phase R conducts the entire load current. The magnetic amplifier $b$ is then fully modulated. After 30° (time measured in degree of angle), i. e. at the intersection of the positive halves of the phase voltages R and S, the choke coil 2' associated with phase S takes over the load current; after a passage of time corresponding to another 120°, i. e. at the intersection of the positive halves of the phase voltages S and T, the choke coil 2'' associated with phase T takes over the load current. The magnetic amplifier $b$ is in the utmost rectifier range. If, after another 30°, i. e. at the beginning of the control period T, a voltage pulse of suitable amplitude is applied to the control winding 6, then the choke coil 2 does not take over the load current from the choke coil 2'' after 120° but rather after 120° plus 90° (210°). This pulse may be of the amplitude $$\left(\frac{W_6}{W_2}\right)(2\,U)$$

[time measured by the degree of angle, $$\frac{W_6}{W_2}$$

the winding ratio of the windings or coils 2 and 6, $U=$ the peak value of the alternating voltage main]. If the winding or coil turn ratio should be 1, the value $$\frac{W_6}{W_2} \text{ would equal } 2\,U$$

i. e. equal to twice the amplitude of the main alternating voltage. This corresponds to the time integral extended over a half period of the sine wave alternating voltage. The corresponding voltage time level is indicated in Fig. 2 by vertical hatching. The part of this level lying under the time axis $t$ corresponds to the negative displacement of the neutral (star) point of the rectifier valves 3, 3', 3'' as caused by the choke coil 2''. Only after 120° can the phase R and thereby the choke coil 2 take over conduction of the load current. Until then the phase T and thereby also the choke coil 2'' continues to conduct the load current. As shown in Fig. 2 by the thickened lines the phase T and the choke coil 2'' conduct the load current in the negative half period also, but now bucking the main voltage U. The exciter coil 4 of the D.-C. motor returns magnetic energy to the main voltage U, and the reset magnetic amplifier now operates as an inverter. After the throttle or choke coil 2'' has conducted the load current over 210° the choke 1 is magnetized to the bend in the saturation curve for the choke core, so that now the phase R and the choke coil 2 takes over the load current again. If in the next control period $T_1$, the voltage pulse be made equal to $$\left(\frac{W_6}{W_2}\right)(3.5)(U)$$

effective at the choke, then the choke coil 2' can also not take over the load current with the positive half of the voltage mains period or cycle, but only after 60°+120° equalling thus 180°. The last named voltage time integral, with the same number of turns on the control and working windings amounts to (3.5) (U). But this is the value of a voltage time level 4U extending over two half cycles insofar as the voltage is a sine form, minus that voltage time level which is due during the last 60°. The content of the latter is equal to (0.5) (U). In Fig. 2 this demagnetizing voltage time level is marked by horizontal hatching. The parts of this voltage time level lying below the time axis $t$ again corresponds to the neutral displacement of the rectifier valves 3, 3' and 3'' into the negative. Phase R and choke coil 2 thereby conduct the load current farther up to the zero pass point of phase S, i. e. 120° within the negative half cycle of the alternating voltage supply mains. Now too, the exciter coil 4 again returns magnetic field energy to the alternating voltage supply mains when the reset magnetic amplifier operates as an inverter. The phase S with the choke coil 2' even from the start takes over conduction of the current with a negative value of the alternating voltage supply main but this means only that the maximum modulation on the inverter range is attained. A study of the working periods of the reset magnetic amplifier as illustrated in Fig. 2, indicates that a time interval (control period) free from the working current in the entire modulation range (serving to demagnetize the core), is available only during the 60° intervals at the end of the alternating voltage periods. In accordance with this invention, by designing the control windings 6, 6' and 6'' to a winding ratio of $$\frac{W_6}{W_2}=1:6$$

and by modulating choke coils 5, 5' and 5'' only between zero and 60°, a suitable voltage pulse is produced (which may be considered as being obtained by cutting out the alternating voltage main or a corresponding voltage time integral as indicated by the diagonal hatching in Fig. 2).

One must still mention that the negative voltage fades out at the exciter coil 4 when its field energy is fed back to the alternating voltage supply means. The said negative voltage is then reduced to the very small values originating from the magnetizing current of the chokes 1, 1' and 1".

Figure 3:
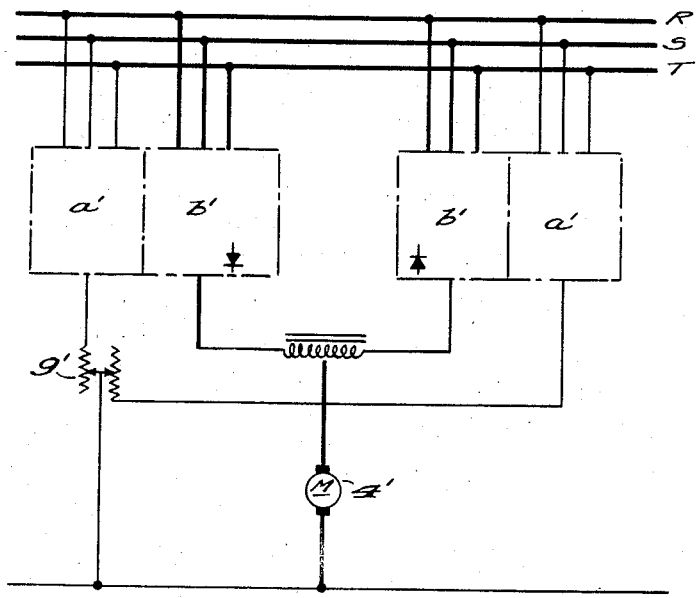
Fig. 3 is also a circuit diagram showing a modification of the Fig. 1 circuit.

A modification of the invention is illustrated in Fig. 3. Here, two reset magnetic amplifiers $b'$ with direct current conduction at the outlet side in opposing parallel or cross connection supply the direct current motor 4'. The two sets of control reset magnetic amplifiers $a'$ by which the amplifiers $b'$ are controlled are themselves controlled in countercurrent relation by a common control unit 9'. At a result, one reset magnetic amplifier operates as a rectifier while the other one operates as an inverter. Thereby, a reversal of the current direction becomes possible for the first time in a load supplied by magnetic amplifiers without destroying, in decoupling resistances, a multiple of the actually required outputs.

I claim:

1. Rectifying apparatus controlled by reset magnetic amplifier means for rectifying an alternating current source into direct current which is supplied to a direct current load comprising an output stage reset magnetic amplifier having a working winding and a control winding, said working winding being connected at one end to the alternating current source, a rectifier connected in series with the other end of said working coil and to one end of the direct-current load, the other end of said load being connected to ground, said rectifier being of a polarity to conduct current toward ground through the direct current load; and an input stage reset magnetic amplifier for modulating the operation of said output stage reset magnetic amplifier, said input stage magnetic amplifier having an inductive choke connected at one end to the alternating current source, a working circuit connected in series between the other end of said choke and ground, said working circuit comprising in series the control winding of said output stage reset magnetic amplifier and a rectifier of a polarity to conduct current from ground through said control winding to said choke, and a control circuit in parallel with said working circuit, said control circuit comprising in series a rectifier and a variable control resistor, said rectifier being of a polarity to permit conduction of current toward ground through said control resistor.

2. Rectifying apparatus controlled by reset magnetic amplifier means for rectifying a multi-phase alternating current source into direct current which is supplied to a direct current load comprising an output stage reset magnetic amplifier, said amplifier having star-connected working circuits connected to the phases of the alternating current source and control windings associated with each of said working circuits, the neutral connection of the star being connected to one end of the direct current load and the other end of the load being connected to the neutral conductor of the alternating current source, each of said working circuits comprising a working coil connected in series with a rectifier having a polarity to conduct current toward the neutral conductor through the direct current load; and an input stage reset magnetic amplifier for modulating the output stage reset magnetic amplifier comprising inductive choke coils connected at their one ends to the phases of the alternating current supply, working circuits connected at their one ends to the other ends of said choke coils and at their other ends to the neutral conductor, each of said working circuits including in series the control winding associated with the corresponding phase of the working circuit of the output stage reset magnetic amplifier and a rectifier of a polarity to conduct current from the neutral conductor through the control winding to the choke coil, and control circuits connected in parallel with said working circuits, said control circuits comprising star-connected rectifiers connected to the other ends of the choke coils and a common variable control resistor connected in series between the neutral point of the star and the neutral conductor of the alternating current source, said rectifiers being of a polarity to conduct current from said choke coils through said resistor to the neutral conductor.

3. Rectifying apparatus as defined in claim 2 wherein the source is three-phase alternating current and wherein the control and working windings of the output stage reset magnetic amplifier have a winding ratio of approximately 1:6.

4. Rectifying apparatus as defined in claim 2 and further including a second pair of input and output stage reset magnetic amplifiers connected in opposing parallel with the first input and output stage reset magnetic amplifiers, whereby one output stage magnetic amplifier operates as an inverter and the other output stage magnetic amplifier operates as a rectifier.

5. Apparatus as defined in claim 4 wherein both input stage reset magnetic amplifiers have a common variable control resistance.

References Cited in the file of this patent

UNITED STATES PATENTS

| | | |
|---|---|---|
| 2,653,293 | Huge | Sept. 22, 1953 |
| 2,725,521 | Geyger | Nov. 29, 1955 |
| 2,780,771 | Lee | Feb. 5, 1957 |